Aug. 13, 1929.                H. FORD                1,724,346
TANK CAP
Filed Feb. 13, 1928
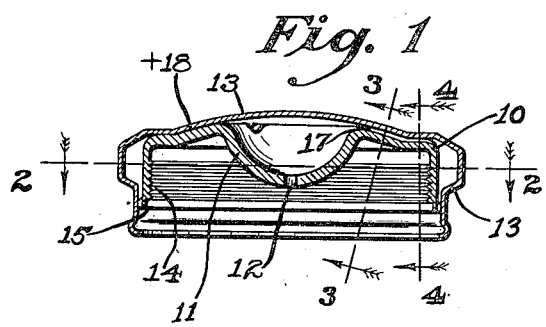
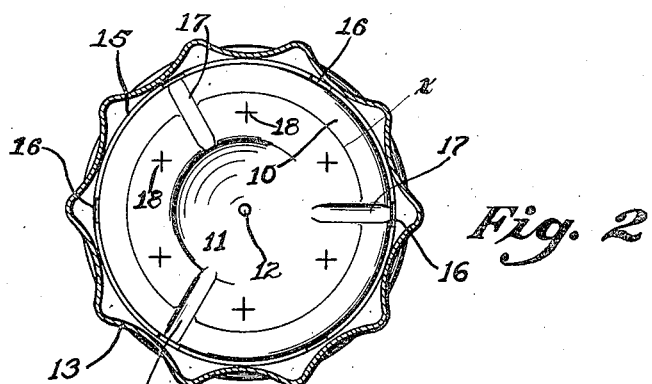
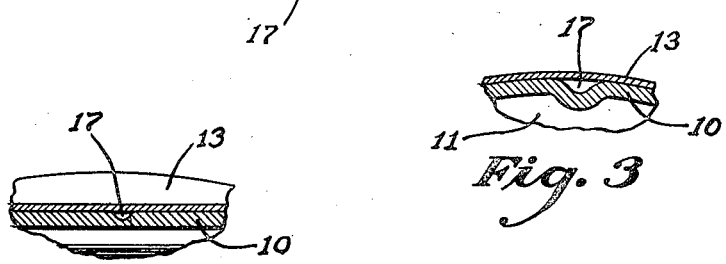
INVENTOR.
Henry Ford.
BY C. R. Halbert.
E. L. Davis.
ATTORNEYS.

Patented Aug. 13, 1929.

1,724,346

UNITED STATES PATENT OFFICE.

HENRY FORD, OF DEARBORN, MICHIGAN.

TANK CAP.

Application filed February 13, 1928. Serial No. 253,907.

The object of my invention is to provide a tank cap of simple durable and inexpensive construction.

Still a further object of my invention is to provide the cap for the filler necks of storage tanks for liquids which will be especially adapted for the fuel tanks of motor vehicles.

Still a further object of my invention is to provide a cap for a fuel tank where means are provided so that air may be admitted to the tank as the fuel is exhausted therefrom but the fuel cannot splash out from the cap and no foreign matter may enter the tank to prevent pollution of the tank contents.

With these and other objects in view my invention consists in the arrangement, construction, and combination of the various parts of my improved device, as described in the specifications, claimed in the claims, and illustrated in the accompanying drawings, in which:

Figure 1 shows a vertical central transverse sectional view through my improved cap.

Figure 2 shows a horizontal sectional view taken on the line 2—2 of Figure 1.

Figure 3 shows a vertical sectional view taken on the line 3—3 of Figure 1, and

Figure 4 shows a vertical sectional view taken on the line 4—4 of Figure 2.

Referring to the accompanying drawings, it will be noted that I have made my improved cap by nesting one cup shaped piece of metal inside of another cup shaped piece of metal. The inner cup is dished downwardly so as to form a chamber between the two cups adjacent to their central top portions. The bottom of this chamber is perforated so that air may be admitted to the tank and of course some fuel may splash through this opening into the chamber between the two caps. Provision is made for admitting air from the lower edges of the cups up to this chamber through spaces provided between these caps whereby rain or other water cannot run into the fuel tank, the fuel cannot splash out, and air may be admitted to the tank to replace fuel drained therefrom.

In the embodiment of the device illustrated in the drawings, I have used the reference numeral 10 to indicate the inner cap just mentioned. This inner cap has a bowl shaped portion dished down in the center thereof so that the space between the bowl and the central part of the outer cap 13 may form a relief chamber 11. The bottom of this chamber 11 is vented at 12 into the gas tank, (not shown) so that any gasoline which splashes up through the vent 12 into the chamber 11 may run back into the gas tank and air may be admitted through this vent 12 to the gas tank at all times. The inner surface of the sides of the cup 10, are threaded as at 14 so that they may co-act with co-operating threads of a gas tank filler neck. The lower edge of the cup 10 has an outwardly extending peripheral flange 15 formed integral therewith which is cut way or slotted at intervals as at 16 so that air may pass upwardly between the sides of the cups 10 and 13 through these slots 16.

The upper surface of the cap 10 is provided with grooves 17 which form a communication between the chamber 11 and the space between the sides of the caps 10 and 13. These grooves 17 are preferably formed in the inner cap 10 by means of a coining press, so that the lower surface of the central part of the cap will not be deflected from a horizontal so that a washer may be disposed between this under side of the cup and the top of the filler neck (not shown) to make a liquid tight joint between the cap and the filler neck. These cap members are welded together by spot welding at a plurality of points such as are indicated by the crosses 18 in Figures 1 and 2.

From the foregoing it will be seen that the outer cap member 13 does not have any opening therethrough so that rain or other water will not pass therethrough and into the fuel tank. As the fuel drains out of the fuel tank air may be drawn up around the space between the inner and outer cap through the slots 16 and grooves 17 into the chamber 11 from which it may pass through the vent 17 into the fuel tank. In case the fuel in the fuel tank starts to splash, then relatively small quantities may splash up through the vent 17 into the chamber 11 but as soon as the splashing ceases or between splashes this fuel will run back into the tank so that no loss of fuel will occur. The design of my improved cap is such that I have provided a very simple construction which may be formed in punch presses or similar devices, and the cap does not permit entrance of foreign substances or loss of the substance in the tank.

Some changes may be made in the arrangement, and construction of the various parts of my improved device without departing from the spirit of my invention, and it is my intention to cover by my claims such changes as may reasonably be included within the scope thereof.

I claim as my invention:

1. In a device of the character described, an inner cup member having a bowl portion formed in the center thereof with a vent in the bottom thereof and means formed in the sides thereof whereby it may be screwed to a filler neck, said inner cup member also having a groove coined in the upper surface thereof, and a second cup member secured to the inner cup member and surrounding same, the second cup being so shaped and so secured to the first cup that a restricted air passage is provided between the bottom edge of the outer cup and the upper edge of the bowl in the inner cup.

2. In a device of the character described, a pair of concentric cup members secured together and shaped to form a chamber in the center thereof and a restricted passage between the chamber and the edges of said cups.

HENRY FORD.